March 3, 1936. B. M. FROMKNECHT 2,033,068
GRILL
Filed Aug. 29, 1934
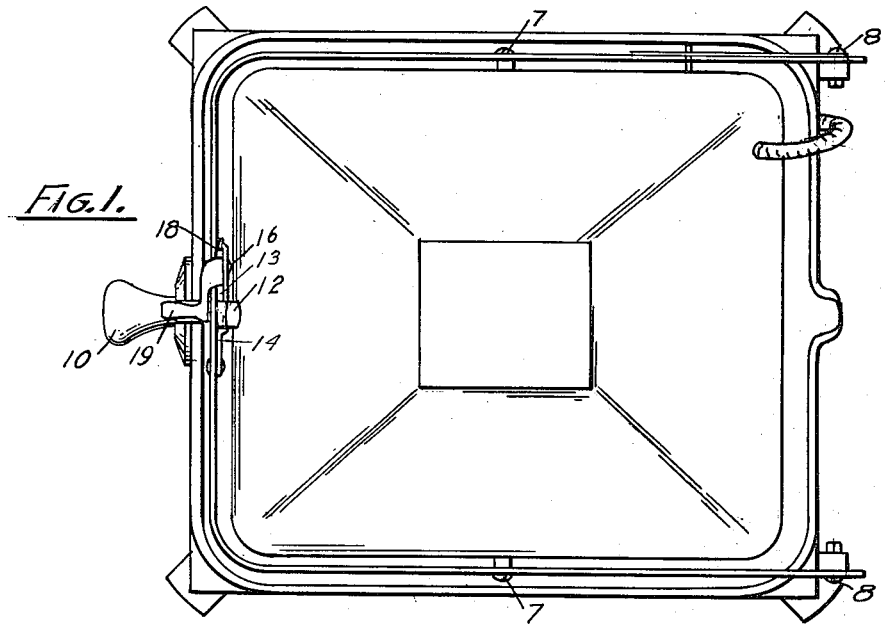
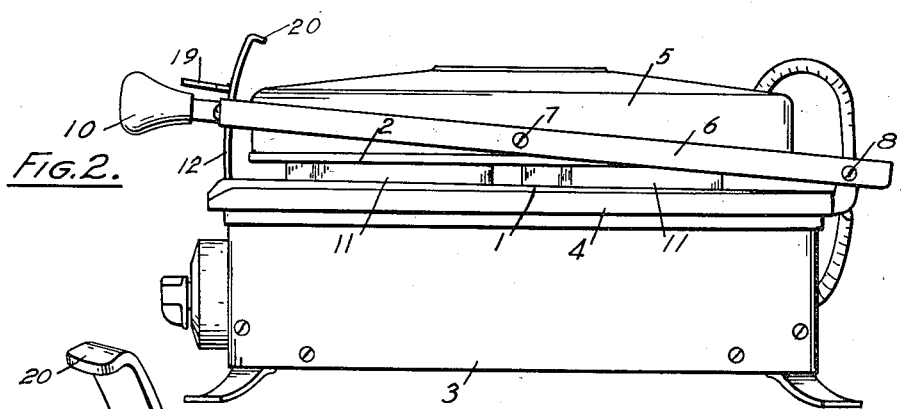
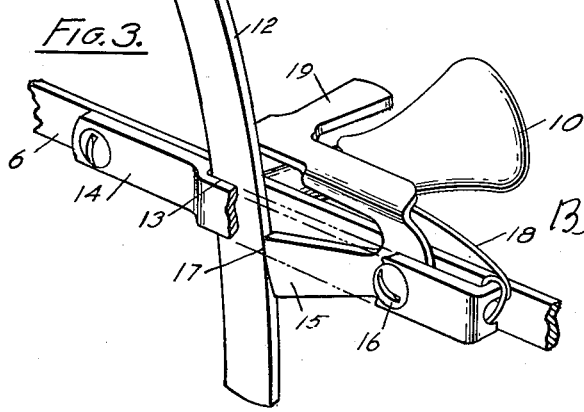
Bernard M. Fromknecht
INVENTOR.
BY
ATTORNEYS.

Patented Mar. 3, 1936

2,033,068

UNITED STATES PATENT OFFICE 2,033,068

GRILL

Bernard M. Fromknecht, Erie, Pa., assignor to The Griswold Manufacturing Company, Erie, Pa., a corporation of Pennsylvania Application August 29, 1934, Serial No. 741,932

6 Claims. (Cl. 53—5)

Some grills provided with cooking plates provide an adjustment between the cooking plates so that materials of different thicknesses being cooked may be accommodated. Some materials require some pressure of the cooking surfaces for the best results. It is desirable, therefore, to provide means whereby the space between the plates may be readily adjusted and inasmuch as this adjustment may be of frequent occurrence it should be one that may be conveniently accomplished, and preferably in a manner that permits the operator to sense the pressure which is exerted at the point of adjustment. The present invention is designed to provide a simple and convenient means for accomplishing such an adjustment. Features and details of the invention will appear from the specification and claims.

A preferred embodiment of the invention is illustrated in the accompanying drawing as follows:

Fig. 1 shows a plan view of a grill with the invention in place thereon.

Fig. 2 a side elevation of the grill.

Fig. 3 a perspective view of the means for adjusting the grill for different spacing of the cooking surfaces.

The grill has cooking surfaces 1 and 2. The lower surface 1 is carried by a base 3 and is provided with an electric heating element 4. The upper cooking plate 2 is backed by an upper heating element 5. The upper plate is carried by a bail 6, the sides of the bail being pivotally connected with the plate at each side of the bail by pintles 7. The bail is pivotally mounted at 8 on the base. A handle 10 is provided at the front end of the bail by means of which the upper plate may be swung free of the lower plate so as to permit the placing of the material 11 to be cooked on the grill and the removing therefrom and also for adjusting the upper plate so as to control the space between the plates to properly accommodate the material.

In order to lock the plates in any adjustment to which they may be brought by the operation of the bail, the bail is provided with a support 12 which is slidingly mounted in a slot 13 formed by a strap 14 secured to the inner face of the bail. A cam latch 15 is pivoted on a screw 16, this screw being utilized for securing one end of the strap 14. The cam latch has a cam surface 17 which engages the edge of the support 12 and locks it in its adjusted position. A spring 18 is secured on the bail and operates on the latch to automatically swing the latch into locking position. The latch has a thumb plate 19 extending from it into convenient position relatively to the handle so that the latch may be released preferably by the thumb of the hand of the operator engaging the handle. The support 12 slides up by gravity when released through the slot and is prevented from slipping from the slot by a shoulder 20 at its upper end.

In the operation of the device, the operator having placed the material on the lower plate, lowers the upper plate by grasping the handle 10. The operator also places the thumb on the thumb plate 19 and thus releases the latch. The lower end of the support 12 contacts the plate 1 in the downward movement of the bail, but so long as the latch is released the bail may be moved downwardly into position with the material to be cooked and placed at any position desired. At this position the operator merely releases the latch and the latch through its self-locking action secures the support 12 in the adjusted position.

What I claim as new is:—

1. In a grill, the combination of an adjustable cooking plate; an adjustable support for the plate; and a self-acting lock yieldingly forced into locking position securing the support in adjustment.

2. In a grill, the combination of an adjustable cooking plate; an adjustable support for the plate; a handle for manually adjusting said support; and a self-acting lock securing the support in adjustment releasable by the hand of an operator engaging the handle.

3. In a grill, the combination of a cooking plate; a swinging bail on which the plate is mounted; an adjustable support for the bail; and a self-acting lock on the bail.

4. In a grill, the combination of a cooking plate; a swinging mounting for the plate; a sliding adjustable support on the mounting for adjusting the mounting for different positions of the plate; and a self-acting lock for the support.

5. In a grill, the combination of a cooking plate; a swinging mounting for the plate; a sliding support for the mounting; and a cam latch locking the support.

6. In a grill, the combination of a cooking plate; a swinging mounting for the plate; a sliding support for the mounting; a cam latch locking the support; and a handle for the mounting in proximity to the latch, said latch being manually operable by the hand of an operator engaging the handle.

BERNARD M. FROMKNECHT.